United States Patent [19]
Sheba

[11] Patent Number: 5,386,635
[45] Date of Patent: Feb. 7, 1995

[54] HUNTING KNIFE HAVING BLADE WITH COVERED TOP

[76] Inventor: Michael Sheba, 8984 Clarkson Drive, Black Creek, B.C., Canada, V9J1B2

[21] Appl. No.: 265,782

[22] Filed: Jun. 27, 1994

[51] Int. Cl.⁶ .............................................. B26B 29/02
[52] U.S. Cl. ......................................... 30/294; 30/286
[58] Field of Search ................ 30/286, 289, 293, 294, 30/280, 314, 317, 287, 288, 292, 282, 283, 284, 285; 452/132

[56] References Cited

U.S. PATENT DOCUMENTS

| | | | |
|---|---|---|---|
| 1,593,935 | 7/1926 | Gerick et al. | 30/286 |
| 1,614,772 | 1/1927 | Bambini et al. | 30/287 |
| 3,839,788 | 10/1974 | Addis | 30/287 |
| 4,020,550 | 5/1977 | Okada | 30/294 |
| 4,601,102 | 7/1986 | Phillips | 30/286 |
| 4,707,920 | 11/1987 | Montgomery | 30/294 |
| 4,763,416 | 8/1988 | Copeland | 30/294 |
| 4,884,342 | 12/1989 | McNamara et al. | 30/294 |
| 4,937,941 | 7/1990 | Crist | 30/294 |

*Primary Examiner*—Hwei Siu Payer
*Attorney, Agent, or Firm*—Stanley M. Miller

[57] ABSTRACT

A hunting knife has a blade with an elongate cutting edge and a distal free end protected by washers so that the point of the knife is protected during the gutting of game. A central aperture is formed in the distal free end for receiving a screw, and the screw and a nut hold the washers in sandwiching relation to the point of the knife. When the knife is used in gutting, the washers prevent the point of the knife from making unwanted punctures. When the washers are removed, the sharpened distal free end may be used for skinning.

4 Claims, 1 Drawing Sheet

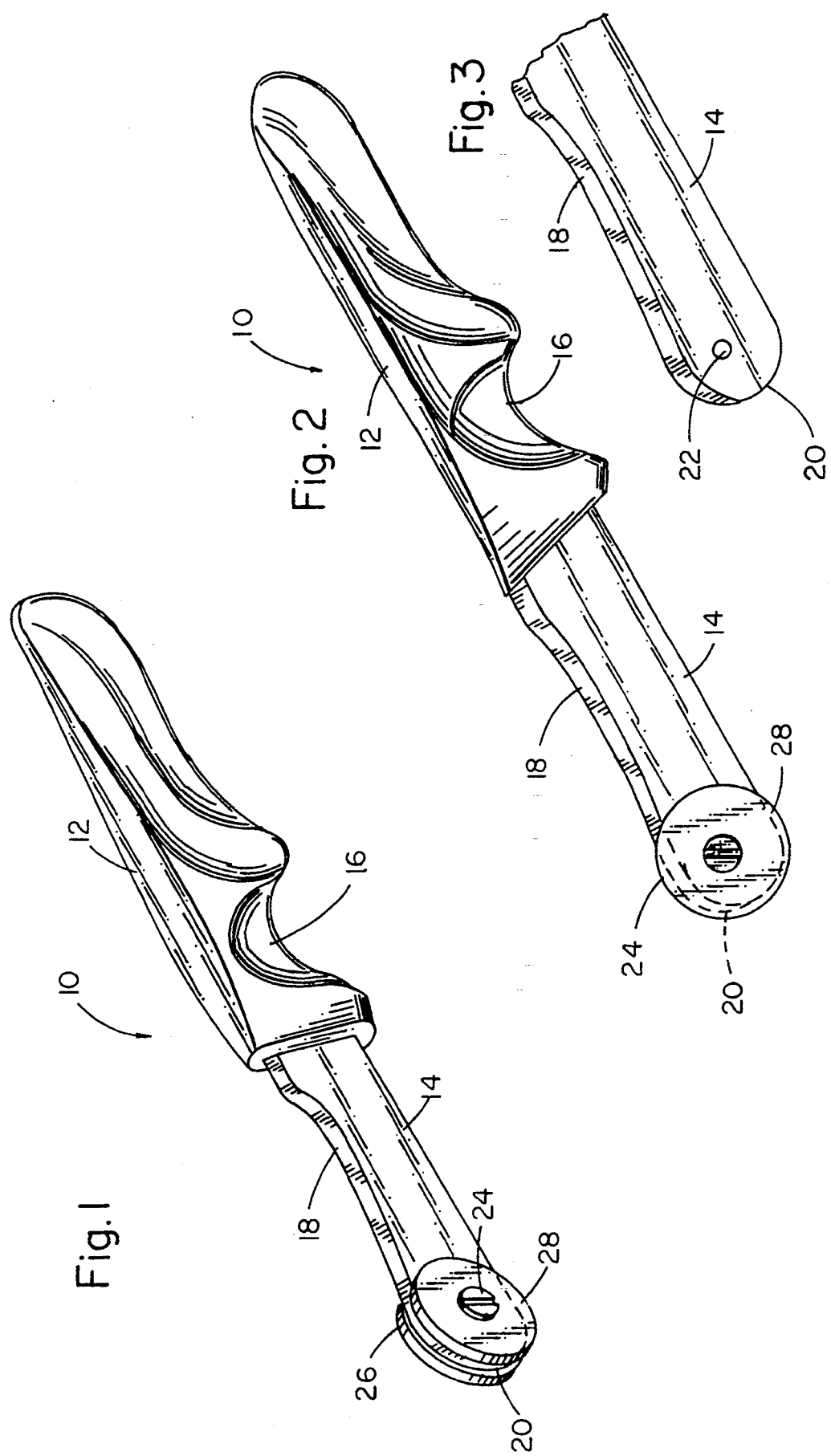

HUNTING KNIFE HAVING BLADE WITH COVERED TOP

BACKGROUND OF THE INVENTION

1. Field of the Invention

This invention relates to hunting knives. More particularly, it relates to a hunting knife having a blade with a covered point to facilitate the gutting of game.

2. Description of the Prior Art

Hunters need to open up an animal after it has been killed to remove the stomach, intestines, and other internal organs that normally are not used for food. A standard hunting knife, however, has a blade ending in a sharp point that can interfere with the gutting process.

The point of a conventional hunting knife blade is not needed when game is opened up; it can even interfere with the task. Thus, an ideal hunting knife blade would not have a pointed distal free end but would have a good cutting edge along its length. Moreover, its unpointed distal free end should include a sharp edge so that it could be used for skinning.

What is needed, then, is an improved hunting knife having a sharpened but covered distal free end and an exposed cutting edge. This would enable the cutting edge to be used during gutting of the game. However, at the time the present invention was made, the prior art neither taught nor suggested to those of ordinary skill how the needed knife could be provided.

SUMMARY OF THE INVENTION

The longstanding but heretofore unfulfilled need for a hunting knife not subject to the limitations of the knives of the prior art has now been fulfilled.

The novel knife includes a handle and a knife blade having an elongate cutting edge and a rounded distal free end with a sharp edge. A central aperture is formed in the rounded free end to receive a screw or other suitable fastening means therethrough. The screw serves as an axle for a pair of washers that are mounted on opposite sides of the rounded distal free end of the knife in sandwiching relation thereto. The washers are free to roll or they may be tightened so that they do not rotate about the axle. Either way, the rollers cover the tip of the knife blade and protect the cavities of the animal from unintentional cutting when the hunter guts it.

Thus it is understood that the primary object of this invention is to advance the art of hunting knives by providing a hunting knife blade having a protected distal free end.

Another object is to provide such a knife where the distal free end of the knife blade may be used for skinning when the protective means is removed.

These and other important objects, advantages, and features of the invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of an illustrative embodiment of the invention;

FIG. 2 is a side elevational view thereof; and

FIG. 3 is a side elevational view of the distal free end of the knife when the protective rollers have been removed.

DETAILED DESCRIPTION OF THE PREFERRED EMBODIMENT

Referring now to the Figures, it will there be seen that an exemplary embodiment of the invention is denoted as a whole by the reference numeral 10.

Knife 10 includes handle 12 and blade 14 supported by said handle in a conventional way. Handle 12 is sculpted as at 16 to provide a finger-receiving recess to enable the hunter to obtain a good grip on the knife with either hand, i.e., the handle is designed for use with either the left or right hand. Edge 18 of blade 14 is the elongate cutting edge of the knife and is used to open up the animal.

As best disclosed in FIG. 3, the distal free end of blade 14, denoted 20, is rounded. It has a sharp edge so that it may be used for skinning when not covered. An unrounded or pointed distal free end is also within the scope of this invention. A central opening 22 is formed in said free end 20 for receiving an axle member that may be provided in the form of a rivet, a screw, or other axle means. In the depicted preferred embodiment, the axle means is a screw having head 24. Note that head 24 is slotted to receive a flat head screwdriver; a Phillips head could also be employed. A nut, not shown, is positioned on the opposite end of the screw.

The screw and nut arrangement are used to hold a pair of washer members, 26 and 28, onto opposite sides of distal end 20. Thus, said distal end 20 is disposed in sandwiched relation between said washers 26, 28. If the hunter wants to allow the washers to rotate, the screw and nut are lightly tightened. If rotation of the washers is not desired, the screw and nut are securely tightened. Either way, the distal end 20 is protected. Where distal end 20 is pointed, as in a conventional hunting knife, the washers will protect the point so that it does not interfere in the gutting process.

Removal of washers 26, 28 restores the knife to its conventional configuration. Thus, a conventional hunting knife may be altered by having a central aperture such as aperture 22 drilled into its pointed distal free end, and washers 26, 28 can then be added thereto whenever it is needed to protect the point of the knife.

Those skilled in the arts of hunting, gutting, and skinning of game will appreciate that this knife practically enables the hunter to open up game with a single hand. It provides a knife having a cutting edge and a skinning edge, and means for covering up the skinning edge when desired.

This invention is clearly new and useful. Moreover, it was not obvious to those of ordinary skill in this art at the time it was made, in view of the prior art when considered as a whole.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A hunting knife, comprising:

a handle;

a blade supported by said handle;

said blade having an elongate cutting edge for gutting game;

said blade having a distal free end;

an aperture formed in said distal free end;

an axle means disposed through said aperture;

a pair of washers disposed on opposite ends of said axle means in sandwiching relation to said distal free end; and means for maintaining said washers in sandwiching relation to said distal free end;

whereby said washers cover and protect the distal free end of said knife.

2. The hunting knife of claim 1, wherein said axle means is a screw and wherein said means for maintaining said washers in sandwiching relation to said distal free end is a nut secured to a free end of said screw.

3. The hunting knife of claim 1, wherein said distal free end of said knife is rounded and has a sharpened edge having utility for skinning when exposed by removal of said washers.

4. The hunting knife of claim 1, wherein said distal free end of said knife is pointed and has a sharpened edge having utility for skinning when exposed by removal of said washers.

* * * * *